United States Patent [19]
Smith et al.

[11] 3,730,151
[45] May 1, 1973

[54] TEMPERATURE-RESPONSIVE CLUTCH

[75] Inventors: Claude A. Smith, Sandusky; Donald L. Williams, Port Clinton, both of Ohio

[73] Assignee: General Motors Corporation, Detroit, Mich.

[22] Filed: Ap. 19, 1971

[21] Appl. No.: 135,186

[52] U.S. Cl. ................123/41.12, 192/82, 192/82 T
[51] Int. Cl. ..........................F01p 7/02, F16d 11/00
[58] Field of Search .................123/41.12; 192/82, 192/82 T

[56] References Cited

UNITED STATES PATENTS

| | | | |
|---|---|---|---|
| 2,877,751 | 3/1959 | Johnston | 123/41.12 |
| 2,819,703 | 1/1958 | Suttle | 123/41.12 |
| 3,209,993 | 10/1965 | Seifert | 192/82 T |
| 2,972,398 | 2/1961 | Davis | 123/41.12 |
| 3,105,580 | 10/1963 | Settimi | 123/41.12 |
| 3,323,596 | 6/1967 | Mobius | 123/41.12 |
| 3,382,852 | 5/1968 | De Lorean | 123/41.12 |

FOREIGN PATENTS OR APPLICATIONS

| 954,784 | 4/1964 | Great Britain | 192/82 T |
|---|---|---|---|

*Primary Examiner*—Laurence M. Goodridge
*Assistant Examiner*—Ronald B. Cox
*Attorney*—Warren E. Finken, A. M. Heiter and John P. Moran

[57] ABSTRACT

A temperature-responsive clutch including sets of two cooperating leaf springs, one set of which is steel and the other of which is nickel-titanide, or NiTi, to effectively engage and disengage clutch faces above and below a predetermined temperature. The characteristics of NiTi are utilized in the structure such that the steel leaf springs provide the disengaging force, while the NiTi leaf springs provide the engaging force, each successfully overcoming the other as required, in response to temperature changes.

3 Claims, 4 Drawing Figures

Patented May 1, 1973

INVENTORS
Claude A. Smith &
BY Donald L. Williams

John P. Moran
ATTORNEY

Patented May 1, 1973

INVENTORS
Claude A. Smith &
BY Donald L. Williams

John P. Moran
ATTORNEY

TEMPERATURE-RESPONSIVE CLUTCH

This invention relates generally to clutches and more particularly to temperature-responsive clutches.

In starting a cold engine it is desirable that the engine cooling fan be declutched and permitted to idle whenever liquid coolant is adequate to maintain normal engine operating temperature without fan action in order to reduce the engine power consumed in driving the fan and to minimize fan noise. Also, after the engine is warmed up, it is desirable that the cooling fan be automatically declutched any time that the ambient temperature drops below a predetermined level.

Accordingly, an object of the invention is to provide an improved temperature-responsive clutch wherein two sets of cooperating leaf springs are employed embodying different alloys with characteristics such that one set serves to overcome the other and engage the clutch above a predetermined temperature, while the other set overcomes the first-mentioned set below a predetermined temperature to disengage the clutch.

Another object of the invention is to provide an improved temperature-responsive clutch embodying two sets of cooperating leaf springs of different alloys, one set being steel and the other being nickel-titanide, or NiTi.

A further object of the invention is to provide an improved temperature-responsive clutch embodying steel leaf springs with clutch plate means secured thereto and NiTi leaf springs in a spaced relationship with the steel springs, the steel springs acting to deform the respective NiTi springs below a predetermined temperature, with the NiTi springs returning to their original position against the force of the steel springs above the predetermined temperature.

Still another object of the invention is to provide an improved temperature-responsive clutch having an input pulley, a shaft member, a fan assembly rotatably mounted on the shaft, clutch means formed on the input pulley, steel springs secured to the fan assembly and having a clutch plate mounted thereon, the steel springs in their free state retaining the clutch plate apart from the clutch means on the input pulley, and cooperating NiTi springs which, below a predetermined transition temperature, are deformed by the steel springs in the latter's free state, and which, above the transition temperature, act to overcome the steel springs and move the clutch plate into contact with the input clutch means to drive the fan assembly therewith.

These and other objects and advantages of the invention will become apparent when reference is made to the following description and accompanying drawings, wherein.

Figures 1, 2:
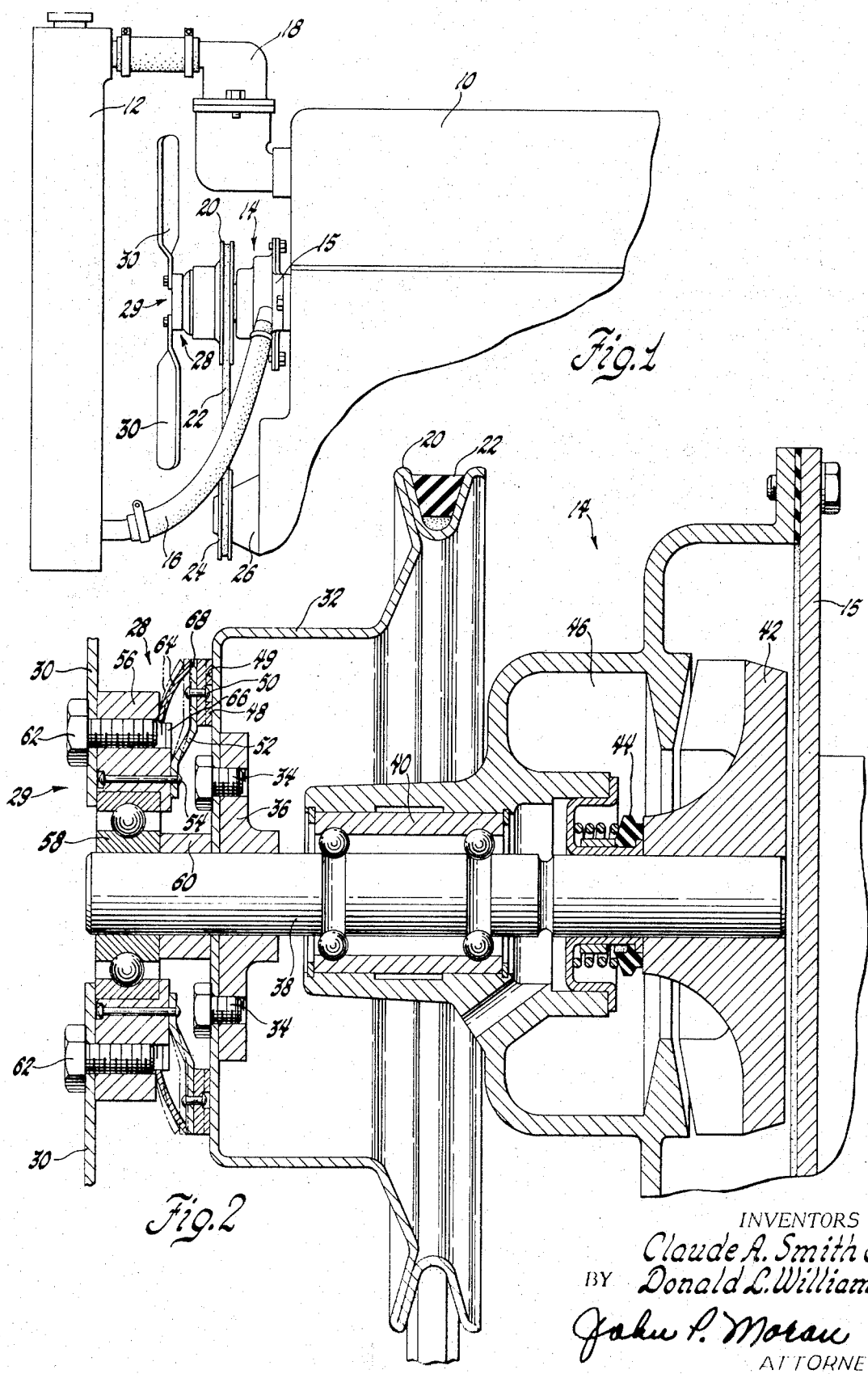
FIG. 1 is a fragmentary side elevational view of an internal combustion engine having a cooling fan and the temperature-responsive clutch of this invention attached thereto.
FIG. 2 is a cross-sectional view of the invention.

Referring now to the drawings in greater detail, FIG. 1 illustrates an internal combustion engine 10, a radiator 12, a water pump assembly 14 secured to the front of the engine 10 by bracket means 15, an outlet conduit 16 between the radiator 12 and the water pump assembly 14, and an inlet conduit 18 communicating between the engine 10 and the radiator 12. A pulley 20, operatively connected to the water pump assembly 14, is driven by a belt 22 extending from a driving pulley 24 mounted on the engine crankshaft extension 26. A temperature-responsive clutch assembly 28 is also operatively connected to the pulley 20 for variably controlling the speed of the engine cooling fan assembly 29, including fan blades 30, in response to temperature.

Referring now to FIG. 2, it may be noted that the pulley 20 is formed on the outer periphery of a cup-shaped input member 32 which is connected by bolts 34 to a flanged member 36 secured to a shaft 38. The shaft 38 extends into the water pump assembly 14, being rotatably mounted therein on bearings 40 and having an impeller 42 mounted on the inner end thereof. A suitable seal arrangement 44 prevents leakage from a chamber 46 of the water pump assembly 14 along the shaft 38.

A clutch plate 48 is secured by any suitable means, such as rivets 50, to the radial outer portion of the adjacent surface of suitable force means, such as a plurality of steel leaf spring members 52. The exposed face of the clutch plate 48 is positioned adjacent a radially extending end surface 49 of the cup-shaped input member 32. The steel spring members 52 are secured by any suitable means, such as rivets 54, at the inner radial portions thereof to a hub or ring member 56 of the fan assembly 29. The ring member 56 is rotatably mounted by bearings 58 on the outer end of the shaft 38. A spacer member 60 is mounted around the shaft 38 between the bearings 58 and the adjacent surface 49 of the input member 32. The fan blades 30 are secured by bolts 62 to the ring member 56. A plurality of nickel-titanide or NiTi strips or leaf spring members 64 are secured by any suitable means at their inner peripheral edges to an annular shoulder 66 formed on the face of the ring member 56 opposite the fan assembly 29. The outer peripheral edges 68 of the NiTi springs 64 are adjacent the outer peripheral edges of the steel spring members 52 on the side opposite the clutch plate 48.

As is well known, and as is explained in U.S. Pat. Nos. 3,403,238 and 3,483,748, and in the following publications: Batelle Research Outlook, 1970, Vol. 2, No. 1, pp. 18–19, ("Nitinol Doesn't Forget"); and Materials Engineering, October 1969 issue, pp. 28–31, ("What you Can Do with That Memory Alloy"), NiTi is an alloy of nickel and titanium which is hard and strong above a predetermined temperature, depending upon the composition range involved, but soft, ductile and plastic below such temperature. It has the characteristic of exerting a force several times greater to return to its original shape, above the transition temperature, than the force required to deform the material below the transition temperature. This material is known to be able to generate up to 110,000 psi of stress in snapping back to its original shape and, by varying the composition of the alloy, the transition temperature can be varied over a substantial range, e.g., −300° to +300° F, as explained in the above-mentioned Batelle Research publication.

In operation, the belt 22, driven by the crankshaft pulley 24, drives the pulley 20 to rotate the water pump impeller 42 via the cup-shaped input member 32, the flanged member 36, and the shaft 38. Below a predetermined ambient temperature, the steel springs 52 are formed such that, in their free state, they will retain the clutch plate 48 apart from the adjacent surface 49 of the cup-shaped member 32 on which the input pulley 20 is formed. At this point, the force exerted by the steel springs 52 is readily able to deform the respective NiTi springs 64 and hold the outer peripheral edges 68 thereof in the leftward position represented by phantom lines in FIG. 2.

Once the predetermined ambient temperature is reached, the NiTi springs 64 will begin bending rightwardly (FIG. 2), returning toward their original free state and, thus, exerting a rightward force at their outer edges 68 on the steel spring members 52. As indicated above, the rightward force at such a temperature is easily able to overcome the force of the steel springs 52. The associated clutch plate 48 is thus urged into contact with the surface 49 of the cup-shaped input member 32. This completes the engagement of the clutch assembly 28 and causes the fan assembly 29 to rotate with the input pulley 20 in direct drive relationship therewith.

When the ambient temperature drops below the abovementioned predetermined temperature, the now relaxed NiTi springs 64 will be urged leftwardly in FIG. 2 by the steel spring members 52 returning to their free-state position, pulling the associated clutch plate 48 away from the surface 49. This, of course, releases the operational drive on the fan assembly 29.

Figures 3, 4:
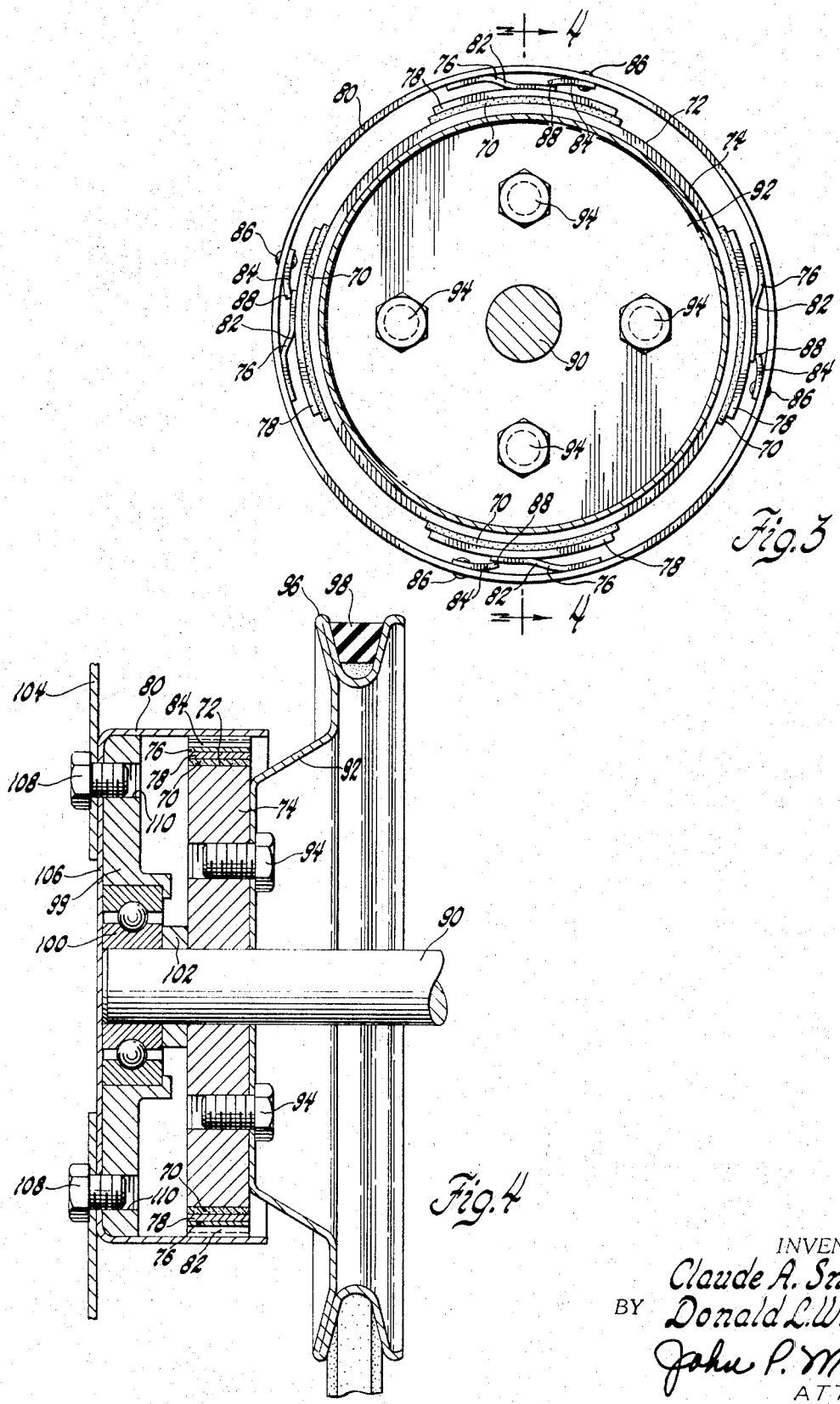
FIG. 3 is a fragmentary end view of an alternate embodiment of the invention.
FIG. 4 is a cross-sectional view taken along the plane of line 4—4 of FIG. 3, and looking in the direction of the arrows.

The embodiment illustrated in FIGS. 3 and 4 is generally similar to that of FIG. 2, except that the engagement action is in a radial direction, rather than an axial direction. A plurality of arcuate-shaped clutch plates 70 are held radially away from a circumferential outer surface 72 of an input disc 74 by steel leaf spring members 76 below a predetermined temperature. The clutch plates 70 are secured to metal back-up plates 78 which, in turn, are secured by any suitable means to the end portions of the respective steel spring members 76. The steel spring members 76 are secured at their other end portions to the inner peripheral surface of a cup-shaped member 80. The intermediate portion 82 of each of the steel spring members is angled between the two secured end portions and serves as the flexible portion thereof.

A plurality of NiTi leaf spring members 84 are located in spaced relationship with the steel spring members 76 and secured at an end portion thereof by any suitable means, such as rivets 86, to the inner peripheral surface of the cup-shaped member 80. The free ends of the NiTi springs 84 abut against the steel spring members 76 adjacent the end of the latter which is secured to the back-up plate 78.

As may be noted in FIG. 4, the input disc 74 is secured to a shaft 90 and is driven by a flanged member 92 to which it is secured by bolts 94. A pulley 96 is formed on the outer peripheral edge of the flanged member 92 and is driven by a belt 98.

A hub or ring member 99 is mounted in the cup-shaped member 80 and is rotatably mounted by bearings 100 on the outer end of the shaft 90. A spacer member 102 is mounted on the shaft 90 intermediate the bearings 100 and the input disc 74. A fan 104 is secured against the end face 106 of the cup-shaped member 80 and threadedly connected by bolts 108 to threaded openings 110 formed in the hub member 99.

In operation, below a predetermined ambient temperature, the clutch plates 70 will be held away from the outer peripheral surface 72 of the input disc 74 by virtue of the force of the steel spring members 76 being able to deform the NiTi springs 84, as explained above. Once the predetermined ambient temperature is reached, the NiTi springs 84, in accordance with their characteristic, begin to bend radially inwardly, the contacting free ends 88 thereof overcoming the force of the steel spring members 76 and urging the latter radially inwardly by bending the intermediate portions 82 thereof. This will bring the clutch plates 70 into contact with the surface 72 of the input disc 74 and hence cause the cup-shaped member 80 to be driven directly thereby, rotating the fan 104 at the same speed as that of the input pulley 96.

It should be apparent that the invention provides a novel temperature-responsive clutch which utilizes sets of two cooperating leaf springs, one of which is steel and the other of which is NiTi, to effectively engage and disengage clutch faces above and below a predetermined temperature. The characteristics of NiTi are utilized in the structure such that the steel leaf springs provide the disengaging force, while the NiTi leaf springs provide the engaging force, each successfully overcoming the other as required.

While but two embodiments of the invention have been shown and described, other modifications thereof are possible.

We claim:

1. A temperature-responsive clutch arrangement comprising an input pulley, a shaft member secured for rotation with said input pulley, an annular output member rotatably mounted on said shaft member, an engine cooling fan secured to said annular output member, an annular input member secured to said input pulley, a plurality of steel spring members secured at one end thereof to said annular output member, a clutch plate secured to the free end of each of said steel spring members, said steel spring members in their free state retaining said clutch plate apart from said annular input member, and a plurality of nickel-titanide spring members secured to said annular output member adjacent said respective steel spring members in spaced relationship therewith, said nickel-titanide spring members being readily deformed by said steel spring members in the latter's free state below a predetermined transition temperature, and said nickel-titanide spring members overcoming the force of said steel spring members above said predetermined transition temperature and moving said steel spring members and said clutch plate into contact with said annular input member to drive said annular output member and said engine cooling fan in direct drive relationship with said input pulley.

2. A temperature-responsive clutch arrangement comprising an input pulley, a shaft, an output ring member rotatably mounted on said shaft, an engine cooling fan secured to said output ring member, an input plate member connected between said input pulley and said shaft, a plurality of radially outwardly extending steel spring members secured at one end thereof to said output ring member, a clutch plate secured to the free end of each of said steel spring members, said steel spring members in their free state retaining said clutch plate axially apart from said input plate member, and a plurality of nickel-titanide spring members secured to said output ring member radially outwardly of said steel spring members in spaced relationship therewith, said nickel-titanide spring members being readily deformed by said steel spring members in the latter's free state below a predetermined transition temperature, and said nickel-titanide spring members automatically overcoming the force of said steel spring members above said predetermined transition temperature and moving said steel spring members and said clutch plate axially into contact with said input plate member to drive said output ring member and said engine cooling fan in direct drive relationship with said input pulley.

3. A temperature-responsive clutch arrangement comprising an input pulley, a shaft, an output member rotatably mounted on said shaft, an engine cooling fan secured to a face of said output member, a plate member connected between said input pulley and said shaft, an input disc secured to said plate member, a plurality of circumferentially extending steel spring members secured at one end thereof to said output member, an arcuate clutch plate secured to the free end of each of said steel spring members, said steel spring members in their free state retaining said arcuate clutch plates apart from said input disc, and a plurality of nickel-titanide spring members secured to said output member adjacent said steel spring members in spaced relationship therewith, said nickel-titanide spring members being readily deformed by said steel spring members in the latter's free state below a predetermined transition temperature, and said nickel-titanide spring members automatically overcoming the force of said steel spring members above said predetermined transition temperature and moving said steel spring members and said arcuate clutch plates into contact with said input disc to drive said output member and said engine cooling fan in direct drive relationship with said input pulley.

* * * * *